United States Patent

Apfelbeck et al.

[11] Patent Number: 5,898,676
[45] Date of Patent: Apr. 27, 1999

[54] METHOD, COMMUNICATION SYSTEM AND CONFERENCE UNIT FOR CARRYING OUT CONFERENCES

[75] Inventors: Jürgen Apfelbeck, Hagen; Bernd Weis, Korntal, both of Germany; William Bosiers, Hove; Philip Stichelbaut, Zwevegem, both of Belgium

[73] Assignee: Alcatel N.V., Rijswijk, Netherlands

[21] Appl. No.: 08/685,445

[22] Filed: Jul. 19, 1996

[30] Foreign Application Priority Data

Jul. 20, 1995 [DE] Germany .......................... 195 26 484

[51] Int. Cl.⁶ .......................... H04L 12/16; H04Q 11/00
[52] U.S. Cl. .......................... 370/260; 370/266; 379/202
[58] Field of Search .......................... 370/259, 260, 370/261, 262, 263, 265, 266, 267; 379/202–206, 130, 112; 348/6, 8, 12, 13, 14, 15, 16, 17

[56] References Cited

U.S. PATENT DOCUMENTS

| | | | |
|---|---|---|---|
| 4,796,293 | 1/1989 | Blinken et al. | 379/202 |
| 4,797,877 | 1/1989 | Pope et al. . | |
| 4,998,243 | 3/1991 | Kao | 379/202 |
| 5,034,947 | 7/1991 | Epps | 379/262 |
| 5,473,363 | 12/1995 | Ng et al. | 379/902 |
| 5,491,508 | 2/1996 | Friedell et al. | 348/16 |

FOREIGN PATENT DOCUMENTS

| | | |
|---|---|---|
| 0349709 | 1/1990 | European Pat. Off. . |
| 0400668 | 12/1990 | European Pat. Off. . |
| 0515703 | 12/1992 | European Pat. Off. . |
| 0523626 | 1/1993 | European Pat. Off. . |
| 3515646 | 8/1986 | Germany . |
| 2282506 | 4/1995 | United Kingdom . |
| 9515047 | 6/1995 | WIPO . |

OTHER PUBLICATIONS

Landeck, Erik, Petri, Bernhard: Grundlagen für Multimedia–Konferenzen im Breitband–ISDN. In: Nachrichtentech., Elektron, Berlin 41, 1992, 5, pp. 165–167.

Schafer, Joachim: Techniken der Broadcast–Datenverteilung. In: netz, Bd. 46, 1993, H. 10, pp. 746–752.

*Primary Examiner*—Ajit Patel
*Attorney, Agent, or Firm*—Milton Oliver; Ware, Fressola, Van Der Sluys & Adolphson LLP

[57] ABSTRACT

It is proposed to use several distributed conference units (KE1, KE2) in a conference system (KS) for carrying out conferences, particularly broadband conferences, and to mix the signals (S1 . . . S4). The signals (S1 . . . S4) from subscriber stations (T1 . . . T4) involved in the conference are not necessarily mixed in a single conference unit, rather the mixing is distributed to several conference units (KE1 . . . KE2). In this way it is possible to mix signals that have a partially common transmission path in the communication system into a component signal (12) by means of a first conference unit (KE1). This mixed component signal (S12) is then transmitted to a second conference unit (KE2) and is mixed in this second conference unit (KE2) with one or more other signals (S3, S4). Since the mixed component signal (S12) during the transmission occupies the same bandwidth as a single signal (S1 . . . S4), the transmission capacity of the communication system (KS) needed for the conference can be kept small.

6 Claims, 3 Drawing Sheets

METHOD, COMMUNICATION SYSTEM AND CONFERENCE UNIT FOR CARRYING OUT CONFERENCES

TECHNICAL FIELD

The present invention concerns a method for carrying out conferences, particularly broadband conferences, in a communication system comprising subscriber stations and a conference unit for mixing signals, wherein a respective signal is transmitted from each of the subscriber stations involved in the conference to the conference unit. It also concerns a communication system for carrying out conferences, particularly broadband conferences, comprising subscriber stations and a conference unit for mixing signals; and to a conference unit for mixing signals for a communication system (KS) for carrying out conferences, particularly broadband conferences.

BACKGROUND OF THE INVENTION

A communication system is known from the published European Patent Application EP 0515703 A1, wherein an exchange connects subscriber stations to a single conference unit. This communication system is used to carry out video conferences. The exchange establishes point-to-point channels between the subscriber stations and the conference unit. In such a communication system, the subscriber stations involved in a conference transmit signals, which in the present case are video and audio signals, to the single conference unit. These transmitted signals are mixed in the conference unit in accordance with the desired arrangement signalled by the subscriber stations. The conference unit then transmits the mixed signals to the respective subscriber stations.

Instead of the assumedly simplified single exchange, a communication system of this type usually has a communications network composed of a number of exchanges, which are interconnected. The subscriber stations involved in the conference are generally connected to different exchanges of the communications network. To transmit the signals from the respective subscriber stations to the single conference unit, each signal being transmitted requires a channel of a predetermined bandwidth in the communications network. The communications network therefore uses a large transmission capacity when it transmits the signals.

Electronic conferences, particularly broadband multimedia conferences, are gaining ever more significance. However, the costs of utilizing transmission capacities are still very high, thus a greater acceptance can only be expected when these transmission costs are lowered.

SUMMARY OF THE INVENTION

It is the task of the present invention to present a solution whereby a low transmission capacity is used to carry out conferences in a communication system. This task is fulfilled by a method for carrying out conferences, particularly broadband conferences, in a communication system comprising subscriber stations and a conference unit for mixing signals, wherein a respective signal is transmitted from each of the subscriber stations involved in the conference to the conference unit, characterized in that the communication system comprises at least a first conference unit and a second conference unit, that in the first conference unit the signals from at least two subscriber stations are mixed to produce a component signal, and that in the second conference unit the component signal is mixed with one or more other signals from one or more other subscriber stations, respectively.

It is further fulfilled by a communication system for carrying out conferences, particularly broadband conferences, comprising subscriber stations and a conference unit for mixing signals, characterized in that the communication system comprises at least a first conference unit and a second conference unit as well as a control unit for controlling the mixing of the signals from the subscriber stations involved in a conference in such a way that the first conference unit mixes the signals from at least two subscriber stations to produce a first component signal, and that the second conference unit mixes the first component signal with one or more other signals from one or more other subscriber stations, respectively.

It is still further fulfilled by a conference unit for mixing signals for a communication system for carrying out conferences, particularly broadband conferences, comprising inputs and outputs; a receiving means for receiving signals arriving at the inputs; an output means for outputting mixed signals; and a mixer for mixing signals received by the receiving means, characterized in that the inputs and outputs are connectable to further conference units of the communication system, that the conference unit further comprises a control unit which checks whether the inputs and outputs are connected to further conference units involved in the conference or to subscriber stations, that the control unit causes a component signal to be outputted via the output means at the output connected to one of the further conference units involved in the conference, said component signal being produced in the conference unit by mixing the signals presented to the inputs except the signal transferred from said further conference unit involved in the conference, and that the control unit causes a composite signal to be outputted via the output means at the output connected to a subscriber station, said composite signal being produced in the conference unit by mixing all signals presented to the inputs.

A basic idea of the invention is to use several distributed conference units in the communication system. The signals from the subscriber stations involved in the conference are not necessarily mixed in a single conference unit, rather the mixing is distributed to several conference units. In this way it is possible to mix signals, which share a partially common transmission path in the communication system, into a component signal in a first conference unit. This mixed component signal is then transmitted to a second conference unit and is mixed with one or more further signals in this second conference unit. Since the mixed component signal occupies the same bandwidth during the transmission as a single signal from one of the subscriber stations, the transmission capacity of the communication system needed for the conference can be kept small.

BRIEF DESCRIPTION OF THE DRAWINGS

To better understand the invention, the following describes three configuration examples by means of FIGS. 1 to 3, where.

BEST MODE FOR CARRYING OUT THE INVENTION

In the following configuration examples, the same reference symbols are used for equal elements, or for those having the same effect.

Figure 1:
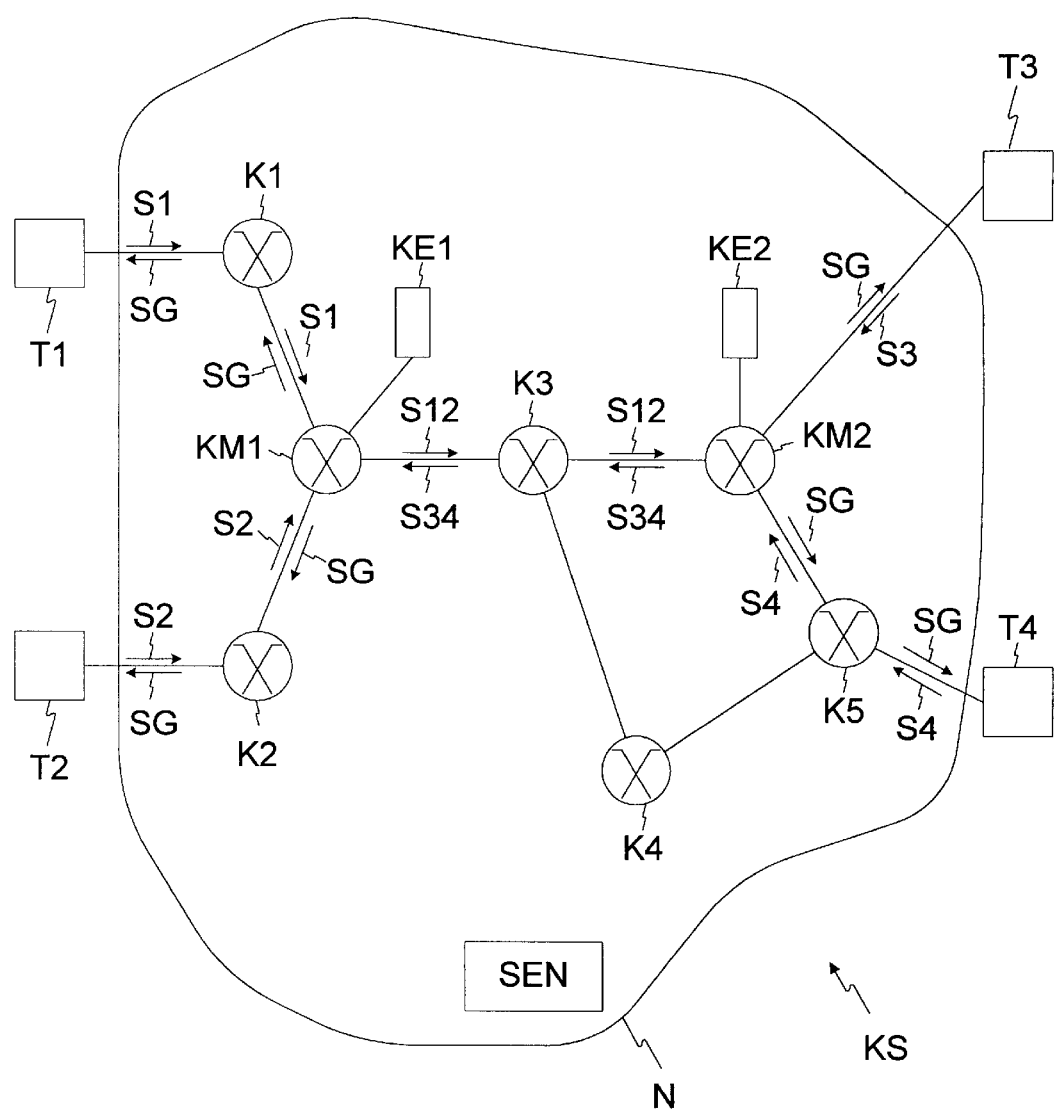
FIG. 1 is a first configuration example of a communication system according to the invention.

A first configuration example in FIG. 1 depicts a communication system KS with four subscriber stations T1 . . . T4, which are involved in a conference. In the present configuration example this conference is a video conference. However, it can also be a different type of conference in which signals from several subscriber stations are mixed. In the configuration example, the subscriber stations T1 . . . T4 are known video-telephones, each of which is connected to a communications network N for switched connections. The communications network N contains a number of exchanges, each of which enables a broadband communication. In this instance, broadband communications are used for a communication with a bit rate of 64 kbit/s (ISDN) as well as for 140 Mbit/s or very much higher bit rates. In the present configuration example, the exchanges of the communications network N are exchanges according to the known ATM standard (Asynchronous Transfer Mode). For reasons of simplicity, only exchanges K1 . . . K5 and KM1 and KM2 of the communications network N are described in the present first configuration example. These exchanges are intermeshed in the following manner. Exchanges K1 and K2 are each connected to exchange KM1. In turn, KM1 is connected to exchange K3 and the latter to exchanges KM2 and K4. Exchanges KM2 and K4 are furthermore connected to exchange K5. The subscriber station T1 is connected to exchange K1, subscriber station T2 to exchange K2, subscriber station T3 to exchange KM2 and subscriber station T4 is connected to exchange K5. A first conference unit KE1 is connected to exchange KM1, and a second conference unit KE2 is connected to exchange KM2. The communication system KS may contain even more conference units. They are not further described here for reasons of simplicity. The conference units KE1 and KE2 are respectively connected to conference unit KM1 or KM2 in the usual manner, like another subscriber station. It is also possible however to incorporate conference units KE1 and KE2 into the associated exchanges KM1 or KM2. The communication system KS contains a control unit SEN which controls the routing guidance within the communication system KS, and in particular to establish the connections of the subscriber stations T1 . . . T4 involved in the conference to the conference units KE1 and KE2, thus controlling the mixing of the signals from the subscriber stations T1 . . . T4 involved in the conference. In the present communication system KS, the control unit SEN is centrally located in the communication system. It is also possible to distribute the control unit SEN decentrally in the exchanges.

Figure 2:
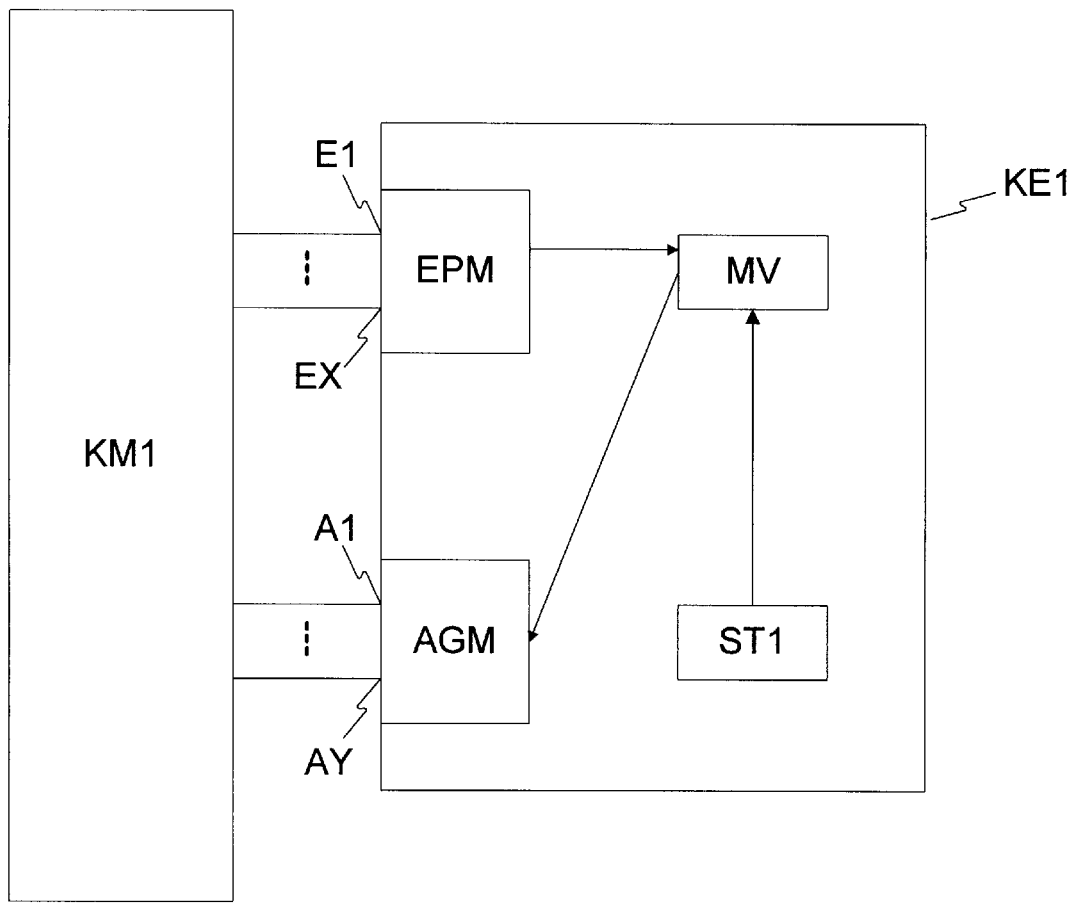
FIG. 2 is a configuration example of a conference unit according to the invention.

Representing the construction of the conference units, the following describes a configuration example of the conference unit KE1 in FIG. 2. In the present configuration example the conference unit KE1 comprises x inputs E1 . . . EX and y outputs A1 . . . AY, which can be connected to exchange KM1. The inputs E1 . . . EX are connected to a receiving means EPM for receiving signals that arrive at inputs E1 . . . EX, and the outputs A1 . . . AY are connected to an output means AGM for outputting mixed signals. The conference unit KE1 furthermore contains a mixing unit MV for mixing the signals received from the receiving means EPM, and a control unit ST1 which controls the functions that can be carried out with the conference unit. Means which are not further described ensure that the signals mixed by the mixing unit MV are time-synchronized.

The following describes the operation mode of the communication system KS and the conference units KE1 and KE2 for a video conference between the subscriber stations T1 . . . T4. Signals transmitted to the subscriber stations or to the exchanges, or signals transmitted from them, are illustrated in FIG. 1 for the purpose of clarification. The control unit SEN controls the establishment of the connections needed for the conference in the communication system KS. A routing guidance is implemented to that end, which takes into account the arrangement of the conference units inside the communications network N. In the present first configuration example, the subscriber station T1 transmits a signal S1 to exchange KM1 via exchange K1. Subscriber station T2 transmits a signal S2 to exchange KM1 via exchange K2. The signals S1 and S2 are transmitted by exchange KM1 to the first conference unit KE1 that is connected to KM1. There the signals arriving at the inputs, for example S1 at input E1 and S2 at input E2, are received by the receiving means EPM. The receiving means EPM routes the signals S1 and S2 to the mixing unit MV. The mixing unit MV mixes the two signals S1 and S2 into a first component signal S12 in accordance with known algorithms, and transmits the first component signal S12 to an output means AGM, which transmits the first component signal S12 to exchange KM1 via one of the outputs, for example output A1. Then, the first component signal S12 is transmitted via exchange K3 to exchange KM2, and from there to the conference unit KE2 which is connected to KM2. Subscriber station T3 transmits a signal S3 to exchange KM2, as well as subscriber station T4, which transmits a signal S4 to exchange KM2 via exchange K5. The signals S3 and S4 are also transmitted to the second conference unit KE2, where they are received in the manner described above for the first conference unit KE1, and are mixed by a mixing unit into a second component signal S34, which is then transmitted to exchange KM1 via an output means. From the exchange KM2, the second component signal S34 is further transmitted via exchange K3 to exchange KM1, and to the first conference unit KE1 connected thereto. For example, the second component signal S34 arrives at input E3 and is received by the receiving means EPM, from where it is routed to the mixing unit MV. The mixing unit MV mixes the second component signal S34 with signals S1 and S2 and in this way creates a composite signal SG of all the subscriber stations T1 . . . T4 involved in the conference. This composite signal SG is transmitted by mixing unit MV to the output means AGM, which outputs it to the exchange KM1 via one of the outputs A1 . . . AY. At first, exchange KM1 transmits the composite signal SG via exchange K1 to subscriber station T1, and secondly to subscriber station T2 via exchange K2. The same thing takes place in the second conference unit KE2 with the first component signal S12 and signals S3 and S4. These three signals S34, S3 and S4 are also used by the mixing unit of the second conference unit KE2 to produce the composite signal SG. This composite signal SG is sent by the output means via one of the outputs to exchange KM2, which transmits the composite signal SG to subscriber station T3, and via exchange K5 to subscriber station T4.

The setup of the conference by control unit SEN can take place in different ways. For example, it is possible to establish a connection from each subscriber station involved in the conference to a central, for example the control unit SEN, and in this way signal to the latter which subscriber stations are involved in the conference. Based on the information stored in the control unit SEN, and through the communications network N and the arrangement of the conference units within the communications network, the control unit SEN then determines which connections must be established in the communication system KS, and which conference units must be activated to mix the transmitted signals. By determining the connections to be established, the control unit SEN establishes a so-called tree of connections for this video conference. Such a tree of connections corresponds to the total of all the connections in the communication system KS needed to carry out the video conference. The determination of the connections to be established, and thereby the determination of the tree through the routing guidance, can take place in accordance with different criteria. For example, such criteria can be the geographic distance between the respective conference unit and the subscriber stations, the most favorable connections according to the tariff structure of the respective subscriber stations, or any other criterion or a combination of different criteria. These connections are established after the tree has been determined, and the conference is carried out through them.

A second possibility of the conference setup comprises for example a stepwise construction of the connections required for the conference. To that end, starting from the subscriber stations, stepwise paths are first switched from exchange to exchange in the usual manner through the routing guidance. If several of these paths coincide in one of the exchanges to which a conference unit is connected, that exchange switches only a single path to the next exchange to which another of the conference units is connected, and to which another path coming from a subscriber station involved in the conference is switched. As described earlier, the signals transmitted via these different paths to the conference unit are mixed into a single component signal in the conference unit. For the transmission, this component signal requires only a single path to the next exchange with a connected conference unit.

A third possibility of the conference setup is for example if the exchanges contain information about the structure of a predetermined local area of the communications network N, for the purpose of the routing guidance. This information comprises in particular data about the arrangement of conference units in this local area. These data can be taken into consideration by the respective exchange when switching paths for the conference setup, so that for example a path is switched for the signal from a subscriber station involved in the conference to an exchange with a connected conference unit, in order for this signal to be mixed there, although the respective exchange would switch a different path if it did not contain the data.

Various possibilities of mixing the signals from the subscriber stations can be envisioned. In the present configuration examples, the control unit of each conference unit checks whether the inputs and outputs of the conference unit are connected to further conference units involved in the conference, or to subscriber stations. The conference unit receives a corresponding signal from the respective subscriber stations and conference units which are connected to its inputs and outputs. If one of the outputs is connected to a conference unit involved in the conference, the control unit causes the output means to output the component signal which was produced by mixing the signals presented to the inputs, except for the signal transmitted by the conference unit connected to the output. If the respective output is connected to a subscriber station, the control unit causes the output means to output the composite signal which was produced by mixing all the signals presented to the inputs of the conference unit. Therefore, in the present configuration example each subscriber station involved in the conference receives the composite signal SG from that conference unit to which it had transmitted its signal for the first time for mixing with other signals.

A subscriber station that is added to the conference, or a subscriber station leaving the conference, can cause the rebuilding of the established connections, thereby changing the tree of connections for the video conference. In that case new conference units can be activated, and already activated conference units can be deactivated. This rebuilding can be undertaken by the control unit SEN, for example. But it is also possible to control the rebuilding through the control units of the respective conference units involved in the conference.

Figure 3:
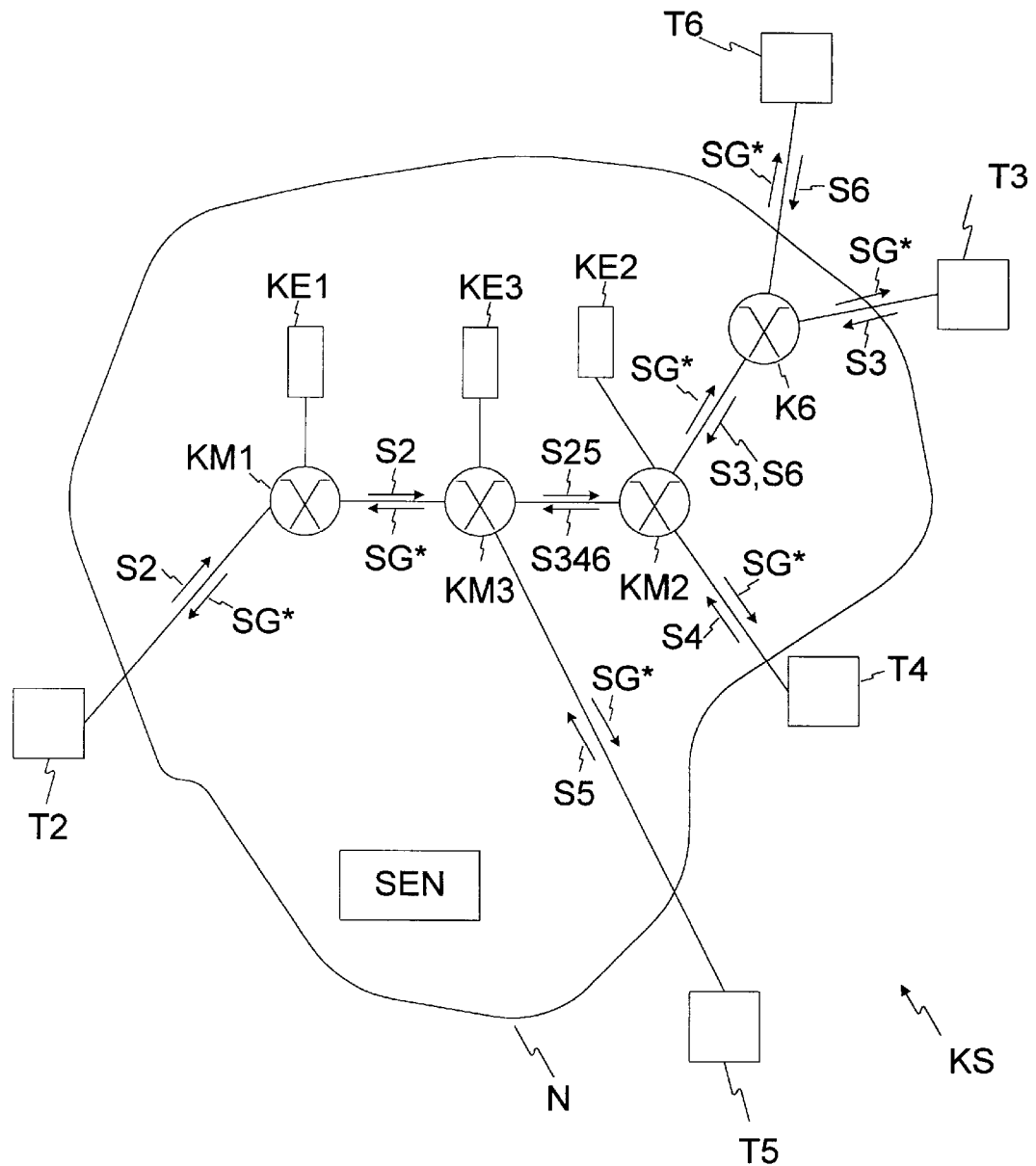
FIG. 3 is a second configuration example of the communication system according to the invention.

FIG. 3 illustrates a second configuration example of the communication system KS of the invention after it was rebuilt. In this second configuration example, subscriber station T1 has left the conference, and subscriber stations T5 and T6 have been added to the conference. This resulted in the rebuilding of the existing connections and the activated conference units.

In this second configuration example, each of the subscriber stations T2 . . . T6 is connected to the communications network N. The exchanges KM1 and KM2 and furthermore an exchange KM3 and an exchange K6 participate in this communications network N. The conference unit KE1 is connected to exchange KM1, the conference unit KE2 is connected to exchange KM2 and a third conference unit KE3 is connected to exchange KM3 in the above described manner. Subscriber station T2 is connected to exchange KM1, subscriber station T5 is connected to exchange KM3, subscriber station T4 is connected to exchange KM3 and subscriber stations T3 and T6 are connected to exchange K6. The exchange KM1 is connected to exchange KM3 and the latter is connected in turn to exchange KM2. Exchange K6 is also connected to exchange KM2. In this second configuration example as well, the communication system KS contains the control unit SEN.

The following describes the transmission and mixing operation of the signals transmitted by the subscriber stations T2 . . . T6 involved in the conference. FIG. 3 illustrates the signals which respectively leave the subscriber stations and the exchanges and those that arrive there. Subscriber station T2 transmits the signal S2 to exchange KM1. Since no further signal from a subscriber station involved in the conference is arriving at exchange KM1, this signal S2 is not routed to the conference unit KE1 connected to exchange KM1, but rather to exchange KM3. The subscriber station T5 transmits a signal S5 to exchange KM3, which routes the signals S2 and S5 to the conference unit KE3 which is connected thereto. The signals S2 and S5 are received by the conference unit KE3 in the manner already described earlier, where they are mixed into a third component signal S25. This third component signal S25 is transmitted by the conference unit KE3 to exchange KM2 via exchange KM3. A signal S4 transmitted by subscriber station T4 to exchange KM2 is routed together with the third component signal S25 to the conference unit KE2 which is connected to exchange KM2. The same thing takes place with signal S6 transmitted by subscriber station T3 to exchange KM2 via exchange K6, and also transmitted by subscriber station T6 to exchange KM2 via exchange K6. The signals S3, S4 and S6 are mixed into a fourth component signal S346 in the conference unit KE2. This fourth component signal S346 is transmitted by the conference unit KE2 to exchange KM3 via exchange KM2, and from there to conference unit KE3. This fourth component signal S346 is mixed with signal S2 into a composite signal SG* by the conference unit KE3. This composite signal SG* is subsequently transmitted by conference unit KE3 to subscriber station T5 via exchange KM3, and furthermore to subscriber station T2 via exchanges KM3 and KM1. In addition, the conference unit KE2 mixes the third component signal S25 with the signals S4, S3 and S6 into the composite signal SG*. This composite signal SG* is transmitted by conference unit KE2 to subscriber station T4 via exchange KM2, and to subscriber stations T3 and T6 via exchanges KM2 and K6. The reception, mixing and output of the signals by conference units KE1 and KE2 is carried out in the manner already described for the first configuration example.

By means of this invention it is also possible for the subscriber stations involved in the conference to compose their desired composite picture individually. To that end they signal to the conference units involved in the conference which of the signals transmitted by the subscriber stations they wish to receive in the composite picture, and which signal they wish to receive as a large screen or as a small screen picture. By means of the invention, the conference units can mix the individual composite pictures for each subscriber station involved in the conference, in accordance with the received signals.

What is claimed is:

1. A method for carrying out conferences, in communication system (KS) comprising subscriber stations (T1 . . . T4) and a plurality of conference units for mixing signals, wherein:

a respective signal is transmitted from each of the subscriber stations (T1 . . . T4) involved in the conference to at least one of the conference units, the communication system (KS) comprises at least a first conference unit (KE1) and a second conference unit (KE2), in the first conference unit (KE1), all signals (S1, S2) received by said first conference unit directly from said subscriber stations are mixed to produce a component signal (S12), in the second conference unit (KE2), the component signal (S12) is mixed with respective signals (S3, S4) from other subscriber stations (T3, T4) involved in the conference so that each subscriber station can hear at least each subscriber station other than itself.

2. A method as claimed in claim 1, characterized in that the subscriber station (T1 . . . T4) involved in the conference are each supplied with a composite signal (SG) of the subscriber stations (T1, . . . , T4) involved in the conference from the conference unit (KE1, KE2) in which their respective signals (S1 . . . S4) were mixed for the first time.

3. A method for carrying out conferences, in a communication system (KS) comprising subscriber stations (T1 . . . T4) and a conference unit for mixing signals, wherein:

a respective signal is transmitted from each of the subscriber stations (T1 . . . T4) involved in the conference to the conference unit, the communication system (KS) comprises at least a first conference unit (KE1) and a second conference unit (KE2), in the first conference unit (KE1), signals (S1, S2) are mixed to produce a component signal (S12), in the second conference unit (KE2), the component signal (S12) is mixed with one or more other signals (S3, S4) from one or more other subscriber stations (T3, T4), respectively;

in each of the conference units (KE1, KE2), a check is made to determine whether their respective inputs and outputs (E1 . . . EX, A1 . . . AY) are connected to a further conference unit (KE1, KE2) involved in the conference or to a subscriber station (T1 . . . T4), the further conference unit (KE1, KE2) involved in the conference is supplied with a component signal (S12, S34) which is produced by mixing said respective signals presented to the respective inputs, except a signal transmitted from the further conference unit (KE1, KE2) involved in the conference, and the subscriber stations (T1 . . . T4) are supplied with a composite signal (SG) which is produced by mixing all signals presented to the respective inputs.

4. A communication system (KS) for carrying out conferences, comprising subscriber stations (T1 . . . T4) and a conference unit for mixing signals, wherein a respective signal is transmitted, from each of the subscriber stations (T1 . . . T4) involved in a conference, to the conference unit, the communication system (KS) comprises at least a first conference unit (KE1) and a second conference unit (KE2) as well as a control unit (SEN) for controlling the mixing of the respective signals from the subscriber units (T1 . . . T4) involved in a conference in such a way that, the first conference unit (KE1) mixes signals (S1, S2) from at least two subscriber stations (T1 . . . T4) to produce a first component signal (S12), the second conference unit (KE2) mixes the first component signal (S12) with one or more other respective signals (S3, S4) from one or more other subscriber stations (T3, T4);

and wherein the control unit (SEN) controls mixing of the signals in such a way that the subscriber stations (T1 . . . T4) involved in the conference each receive a composite signal (SG) of the subscriber stations (T1 . . . T4) involved in the conference from the conference unit (KE1, KE2) in which their respective signals (S1 . . . S4) were mixed for the first time.

5. A communication system as claimed in claim 4, characterized in that the conference units (KE1, KE2) are incorporated in exchanges (KM1, KM2).

6. A conference unit (KE1) for mixing signals for a communication system (KS) for carrying out conferences, particularly broadband conferences, comprising:

inputs and outputs (E1 . . . EX, A1 . . . AY);

a receiving means (EPM) for receiving signals arriving at the inputs;

an output means (AGM) for outputting mixed signals; and a mixer (MV) for mixing signals received by the receiving means (EPM), characterized in that the inputs and outputs (E1 . . . EX, A1 . . . AY) are connectable to further conference units (KE2) of the communication system, that the conference unit (KE1) further comprises a control unit (SE1) which checks whether the inputs and outputs are connected to further conference units (KE2) involved in the conference or to subscriber stations (T1, T2), that the control unit (SE1) causes a component signal (S12) to be outputted via the output means (AGM) at the output connected to one of the further conference units (KE2) involved in the conference, said component signal (S12) being produced in the conference unit (KE1) by mixing the signals (S1, S2) presented to the inputs except the signal (S34) transferred from said further conference unit (KE2) involved in the conference, and that the control unit (SE1) causes a composite signal (SG) to be outputted via the output means (AGM) at the output connected to a subscriber station (T1, T2), said composite signal (SG) being produced in the conference unit (KE1) by mixing all signals (S1, S2, S34) presented to the inputs.

* * * * *

UNITED STATES PATENT AND TRADEMARK OFFICE
CERTIFICATE OF CORRECTION

PATENT NO : 5,898,676
DATED : Apr. 27, 1999
INVENTOR(S): Apfelbeck et al.

It is certified that error appears in the above-identified patent and that said Letters Patent is hereby corrected as shown below:

In abstract, line 10, "(KE1...KE2)" should be --(KE1, KE2)--.

In column 7, line 20, after "in" --a-- should be inserted.

In column 7, line 23, ":" after "wherein" should be deleted.

In column 7, line 46, ":" after "wherein" should be deleted.

In column 8, line 19, "," after "that" should be deleted.

Signed and Sealed this

Seventh Day of September, 1999

Attest:

Q. TODD DICKINSON

*Attesting Officer*  *Acting Commissioner of Patents and Trademarks*